G. D. PARKER.
FRUIT DRYING APPARATUS.
APPLICATION FILED MAY 7, 1918.
1,296,845.
Patented Mar. 11, 1919.
2 SHEETS—SHEET 1.
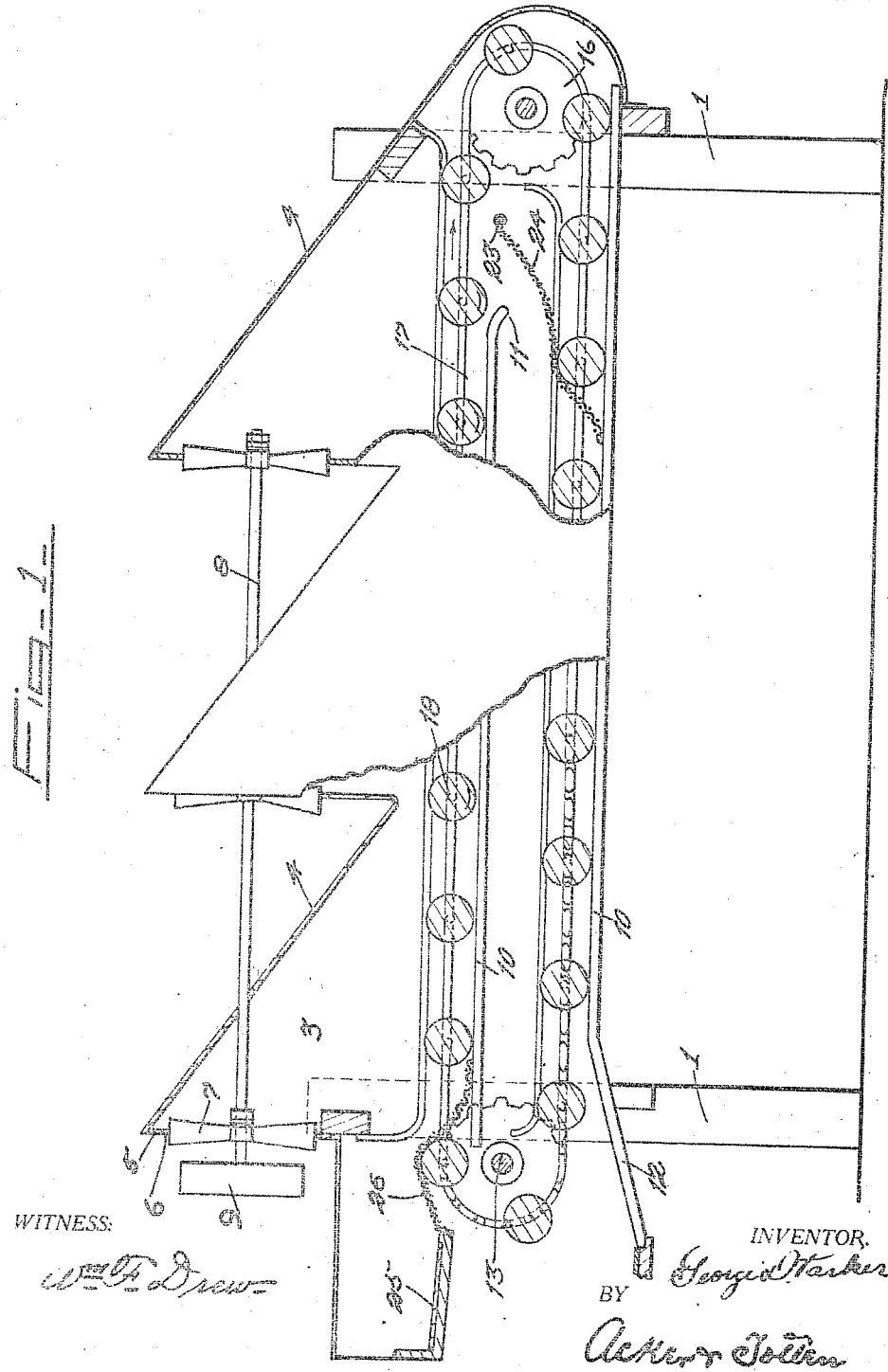
WITNESS:
Wm F. Drew
INVENTOR.
George D. Parker
BY
Acker & Totten
ATTORNEYS

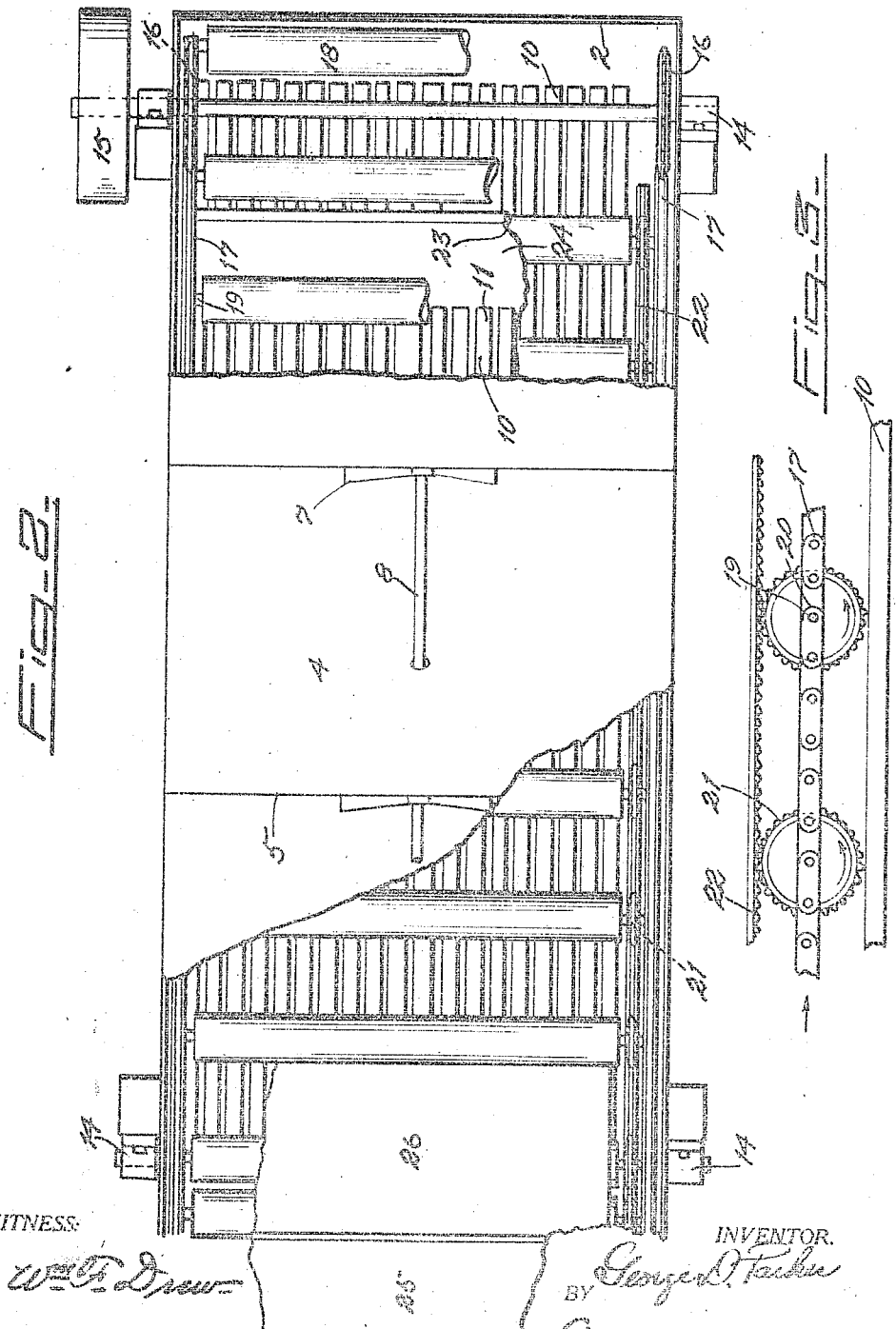

UNITED STATES PATENT OFFICE.

GEORGE D. PARKER, OF RIVERSIDE, CALIFORNIA.

FRUIT-DRYING APPARATUS.

1,296,845.      Specification of Letters Patent.      Patented Mar. 11, 1919.

Application filed May 7, 1918. Serial No. 233,096.

*To all whom it may concern:*

Be it known that I, GEORGE D. PARKER, a citizen of the United States, residing at Riverside, in the county of Riverside and State of California, have invented certain new and useful Improvements in Fruit-Drying Apparatus, of which the following is a specification.

The present invention relates to improvements in conveyers particularly designed for use in fruit driers, and of a type wherein the upper and lower flights of an endless conveyer are employed in conveying the fruit during the drying thereof.

The present invention has for its principal object to provide an improved form of drier and an improved form of conveying structure, whereby the fruit, during the drying thereof, is conveyed with a rolling motion, thereby overcoming the danger of bruising the surface thereof.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in broken side elevation illustrating the preferred embodiment of my invention.

Fig. 2 is a broken top plan view.

Fig. 3 is a detail end view of certain of the conveyer rolls and the member connecting the same.

Referring more particularly to the drawings, wherein like characters of reference designate corresponding parts, 1 indicates suitable vertical supports supporting a suitable drying chamber 2, the top of which is preferably closed by the hoods 3 having the downwardly inclined top walls 4 and the vertical end walls 5. Each of said end walls is formed with an opening 6 and in said opening is mounted a fan or blower 7 carried by a rotatable shaft 8 rotated through the application of power to the band wheel 9 at one end thereof.

Horizontally disposed in superimposed relation within the drying chamber 2 are the parallel spaced slats or members 10 providing upper and lower supports for the fruit as conveyed through the chamber 2. The upper slats terminate short of one end of the drying chamber, as at 11, and the lower slats extend beyond the opposite end of the drying chamber and are downwardly inclined, as at 12, providing a runway for the discharge of the dried fruit from said chamber.

Transversely disposed at opposite ends of the chamber, intermediate the upper and lower slats 10, are the rotatable shafts 13 supported at their ends in bearings 14, and one of said shafts carries a band wheel 15 for receiving power from any suitable source. The shafts at their opposite ends carry sprockets 16 over which operate endless chains 17 between which extend suitable parallel spaced conveying rollers 18, each provided at its opposite end with a pin 19 receivable in a bearing 20 in one of the chain links.

The rollers carry on their opposite ends sprockets 21 which intermesh with the racks 22 positioned one above the respective upper and lower slats 10. Thus it will be apparent that on the movement of the chains in the direction of the arrows—Figs. 1 and 3, rotation will be imparted to the respective rollers. This upward rotation of the rolls in the direction of the travel thereof will cause a rolling of the fruit on the slats 10, and the injury to the surface thereof, often occasioned by the scraping of the fruit over the slats, is overcome.

Supported at its upper end, as at 23, beyond the end 11 of the upper slats 10 is a flexible or fabric member 24, the lower free end of which extends between the chains 17 on the lower conveyer flight, and the fruit as discharged from the end 11 of the upper slats drops onto said member 24, and is delivered by the movement of the rollers onto the lower slats 10 between said rollers.

The fruit to be dried is preferably conveyed to the receiving end of the upper flight of the endless conveyer by a suitable traveling belt 25, or other means, and from said belt passes over the flexible fabric member 26, and on the movement of said rollers is conveyed onto the slats forming the upper conveyer flight.

During the conveying of the fruit with a rolling motion longitudinally of said upper and lower flights, the drying air generated by the fans or blowers 7 is directed downwardly onto the fruit by the walls 4 and passes between the slats, discharging from the open bottom of the chamber 2.

Having thus described my invention, what I claim as new and desire to protect by Letters Patent is:—

1. A fruit drier including a drying chamber, parallel spaced longitudinally disposed members dividing said chamber transversely into superimposed fruit runways on which the fruit rests as conveyed, an endless conveyer within said chamber, one flight of which operates over each of said fruit runways to convey the fruit longitudinally thereof, means for feeding fruit to the end of one of said runways, a flexible fabric member secured at one end to the upper fruit runway and beneath the free lower end of which the lower conveyer flight operates for directing the partially dried fruit from the opposite end of said runway to the adjacent end of an adjacent runway, means for directing the fruit from the opposite end of the latter runway, and means for causing an air circulation within the chamber during the conveying of the fruit therethrough.

2. A fruit drier including a drying chamber, parallel spaced longitudinally disposed members dividing said chamber transversely into superimposed fruit runways formed with openings throughout their length, an endless conveyer within said chamber, one flight of which operates over each of said fruit runways to convey the fruit longitudinally thereof, said conveyer comprising a plurality of spaced conveyer members transversely disposed relatively to said runways and between which the fruit is received when resting on said runways, said members adapted to roll the fruit longitudinally of said runways in the direction of its travel during the conveying thereof, means for feeding fruit to the end of one of said runways, means for directing the partially dried fruit from the opposite end of said runway to the adjacent end of an adjacent runway, means for directing the fruit from the opposite end of the latter runway and means for causing an air circulation within the chamber during the conveying of the fruit therethrough.

3. A fruit drier including a drying chamber, parallel spaced longitudinally disposed members dividing said chamber transversely into superimposed fruit runways, the discharge end of the upper runway terminating short of the receiving end of the runway immediately therebelow, means inclined downwardly from a point in proximity to the discharge end of the upper runway onto the lower runway and onto which the fruit is discharged from the upper runway for directing the fruit from the upper onto the lower runway, and means for causing an air circulation within the chamber during the conveying of the fruit therethrough.

4. A fruit drier including a drying chamber, parallel spaced longitudinally disposed members therein dividing said chamber transversely into superimposed runways formed with openings throughout their length, the upper runway terminating at its discharge end short of the corresponding end of the runway below the same, means for propelling the fruit longitudinally of said runway, means for receiving the fruit from the discharge end of the upper runway and for directing the same onto the lower runway, and means for drying the fruit as conveyed.

5. A fruit drier including a drying chamber, parallel spaced longitudinally disposed members therein dividing said chamber transversely into superimposed open runways, the upper runway terminating at its discharge end short of the corresponding end of the runway below the same, means for rolling the fruit longitudinally of said runways, means for directing the fruit from the discharge end of the upper runway onto the lower runway, and means for drying the fruit as conveyed.

6. In a drier, a plurality of superimposed runways on which the fruit rests during the conveying and drying thereof, of means operating thereon for conveying the fruit longitudinally thereof, a flexible fabric member extended from the discharge end of the uppermost runway onto the runway below the same for receiving and directing the fruit from said upper to the lower runway, and means for drying the fruit as conveyed.

7. In a fruit drier, a plurality of superimposed runways on which the fruit is supported during the conveying and drying thereof, of a conveyer operating thereover for conveying the fruit longitudinally thereof and comprising rollers extending transversely of the runways and arranged in parallel spaced relation, flexible members connecting the ends of said rollers and in which said rollers are journaled, means for operating the conveyer, and means coöperating with said rollers for rotating the same in a direction reverse to the direction of travel of said conveyer.

8. In a fruit drier, a plurality of superimposed runways on which the fruit is supported during the conveying and drying thereof, of a conveyer operating thereover for conveying the fruit longitudinally thereof and comprising rollers extending transversely of the runways and arranged in parallel spaced relation, flexible members connecting the ends of said rollers and in which said rollers are journaled, a sprocket on each of said rollers, and a stationary rack above said runways and with which said sprockets engage for rotating said rollers in a direction reverse to the direction of travel of said conveyer.

9. A fruit drier, comprising a drier housing formed with an open bottom, parallel spaced longitudinally disposed members therein dividing said housing transversely into upper and lower runways provided throughout their length with longitudinal openings, an endless conveyer within said housing, the respective upper and lower flights of which operate one over each of said runways, said conveyer comprising a plurality of spaced rollers, flexible members connecting the ends thereof, a sprocket on each roller, a rack above each runway and with which the respective sprockets engage for rotating the same in a direction reverse to the direction of travel of said conveyer, means for directing the fruit from the discharge end of the upper runway onto the lower runway, and means for forcing air downwardly onto the fruit as conveyed.

10. A fruit drier comprising a housing provided with a substantially horizontal runway therein for supporting the fruit and on which the same rotates during its travel longitudinally through said housing, means for conveying the fruit longitudinally of said runway and comprising a plurality of spaced rollers, endless flexible members connecting the ends thereof, means for operating said conveyer, means for causing a rotation of said rollers in a direction reverse to the direction of travel of said conveyer, and means for drying the fruit as conveyed.

In testimony whereof I have signed my name to this specification in the presence of two subscribing witnesses.

GEORGE D. PARKER.

Witnesses:
C. W. BENSHOOF,
MAY D. FALK.